UNITED STATES PATENT OFFICE.

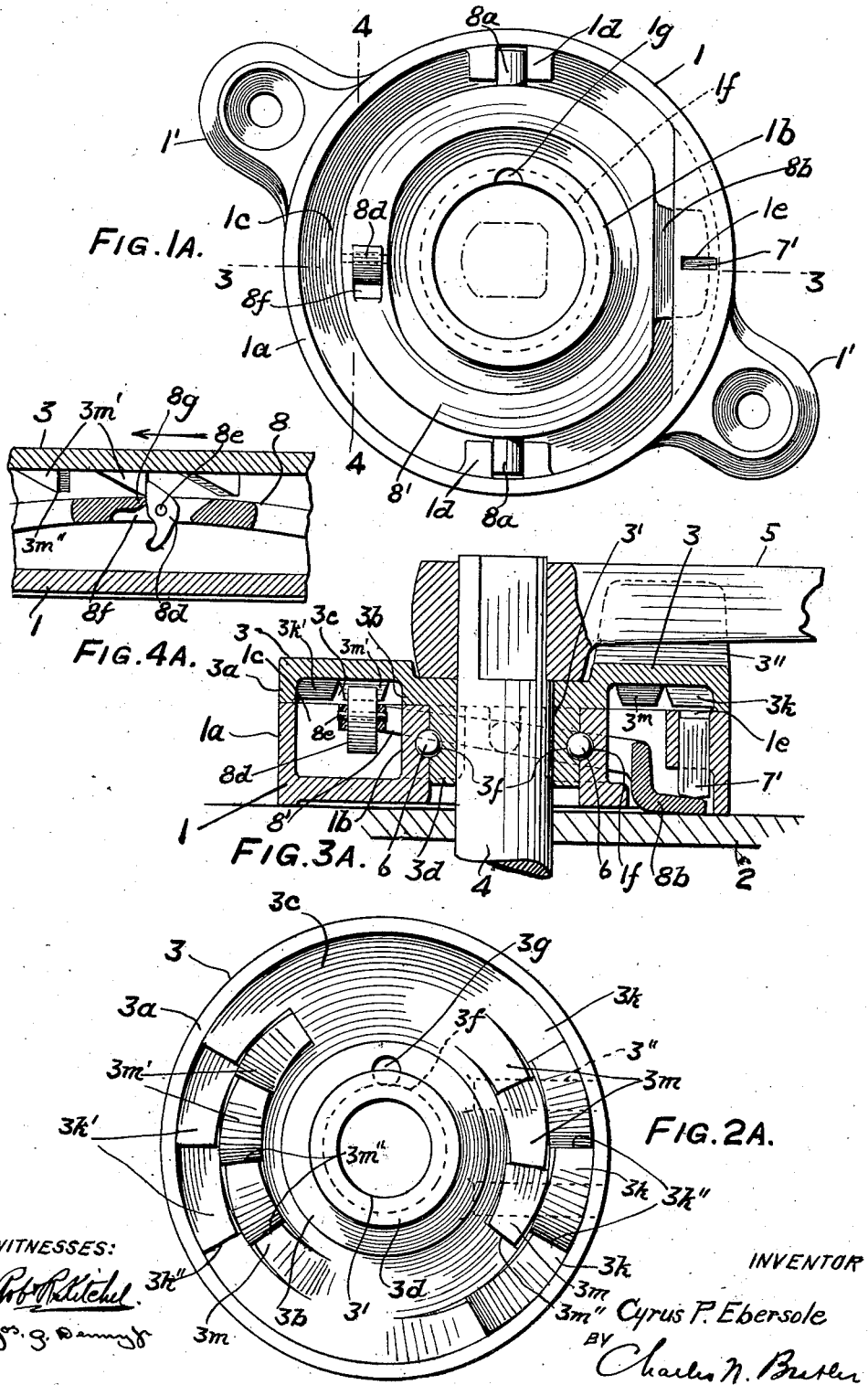

CYRUS P. EBERSOLE, OF PHILADELPHIA, PENNSYLVANIA, ASSIGNOR TO AMERICAN AUTOMOTONEER COMPANY, OF PHILADELPHIA, PENNSYLVANIA, A CORPORATION OF PENNSYLVANIA.

CONTROLLER-REGULATOR.

1,065,927.          Specification of Letters Patent.          Patented July 1, 1913.

Application filed December 30, 1911. Serial No. 668,703.

*To all whom it may concern:*

Be it known that I, CYRUS P. EBERSOLE, a citizen of the United States, residing in the city of Philadelphia, county of Philadelphia, and State of Pennsylvania, have invented certain Improvements in Controller-Regulators, of which the following is a specification.

My invention has as its object the regulation of the operation of electric controllers so that the current cannot be admitted too rapidly to the motor and can be cut out quickly.

The characteristic features of my improvements are fully disclosed in the following description and the accompanying drawings in illustration thereof.

In the accompanying drawings, Figure 1$^A$ is a top plan view of the base of my improved mechanism; Fig. 2$^A$ is a bottom plan view of the hood; Fig. 3$^A$ is a sectional view taken through the assembled construction applied to a controller shaft having the handle thereon; and Fig. 4$^A$ is a sectional view of the assembled construction taken on the line 4—4 of Fig. 1$^A$.

The mechanism, as illustrated in the drawings, comprises the base 1, which is fixed on the top 2 of the controller casing, in combination with a hood 3 having the central aperture 3′ for passing the controller shaft 4 and the lugs 3″ for engagement with the handle 5 by which the hood and controller shaft are operated in unison.

The base 1 is provided with the concentric outer and inner rings 1$^a$ and 1$^b$ forming a channel 1$^c$ in which are the diametrically disposed bearings 1$^d$ and the median bearing 1$^e$.

The hood is provided with the concentric outer and inner rings 3$^a$ and 3$^b$, which bear upon the respective rings 1$^a$ and 1$^b$, the channel 3$^c$ concentric with the channel 1$^c$, and the cylindrical hub 3$^d$ which fits within the ring 1$^b$. Balls 6, inserted through the registering ways 1$^g$ and 3$^g$ of the base and cover, run in the registering ways 1$^f$ and 3$^f$ of the parts 1$^b$ and 3$^d$, whereby the hood is held in place and provided with an anti-friction bearing.

The hood has in the channel 3$^c$ two sets of stops, preferably in the form of ratchet teeth 3$^k$ and 3$^{k\prime}$ having the points 3$^{k\prime\prime}$, disposed in a circle so as to move in succession over the bearing 1$^e$, and concentric therewith two sets of ratchet teeth 3$^m$ and 3$^{m\prime}$ having the points 3$^{m\prime\prime}$ lying within the teeth 3$^k$ and 3$^{k\prime}$. The outer and inner teeth are reversely inclined and the point of each tooth is shown narrower than its base.

The base has in the bearing 1$^e$ a bolt or plunger 7′ which is movable vertically into the path of revolution of the teeth 3$^k$ and 3$^{k\prime}$. A ring 8′ is disposed in the channel 1$^c$ and has the trunnions 8$^a$ which are fulcrumed in the bearings 1$^d$, the projection 8$^b$ which extends under the bearing 1$^e$ into engagement with the plunger 7′, and the dog 8$^d$ fulcrumed on the bearing 8$^e$ in the recess 8$^f$ in the path of revolution of the teeth 3$^m$ and 3$^{m\prime}$. The dog 8$^d$ is provided with a tail piece which holds it normally in the vertical position in engagement with the abutment 8$^g$ of the ring, from which position it can be swung rearwardly so as to lie within the recess 8$^f$.

In operation, when the handle 5 is turned from the "off" position, in the direction of the arrow in Fig. 4$^A$, the hood 3 is revolved upon the base 1 in unison with the revolution of the shaft 4 and the inclined surfaces of the inner ratchet teeth engage the similarly inclined surface of the dog 8$^d$ which, being held against forward movement by the abutment 8$^g$, is forced down bodily, whereby the ring 8 is rocked and the projection 8$^b$ thereof elevates the plunger 7$^l$.

It will be observed that as the inclined surfaces of the inner ratchet teeth 3$^{m\prime}$ (as illustrated in Figs. 3$^A$ and 4$^A$) clear the dog, the vertical surfaces of the outer ratchet teeth 3$^k$ positively engage the plunger, whereby the forward movement of the controller is stopped at the desired point. The ring now assumes its normal position, with the projection 8$^b$ down, and the plunger 7′ will fall by gravity upon relaxing the pressure upon the handle, whereupon the handle can be advanced to turn the controller to the second point, and so on. In reversing, the vertical surfaces of the inner ratchet teeth engage the like surface of the dog, which is moved backward into the recess 8$^f$, without moving the ring 8′ and plunger 7′ from their normal position, whereby a free reverse movement is permitted, the plunger being removed from the outer teeth whose inclined surfaces would otherwise force it down.

Having described my invention, I claim:

1. In a controller regulator, a stationary member, a revoluble member, a reciprocating plunger carried by one of said members, cams and stops fixed relatively to the other of said members, and means whereby said cams move said plunger to effect its engagement with said stops.

2. In a controller regulator, a base, a hood thereon, a locking device disposed in a way in said base, a lever fulcrumed on said base, and cams and stops carried by said hood, said cams operating said lever and thereby moving said locking device into position for engaging said stops.

3. In a controller regulator, a stationary base, a hood revoluble thereon, a lever and a vertically reciprocating plunger carried by one of said members, and cams and stops carried by the other of said members, said cams rocking said lever and thereby moving said plunger into position for engaging said stops.

4. In a controller regulator, a stationary member, a movable member, a lever and a plunger carried by one of said members, cams and stops carried by the other of said members, and means whereby said cams are adapted to rock said lever to move said plunger into position for engaging said stops in moving from the "off" position and are adapted to pass said lever without rocking it when moving to the "off" position.

5. In a controller regulator, a stationary member, a revoluble member, stops carried by one of said members, a lever and means for positively engaging said stops carried by the other of said members, and means comprising a pivoted dog whereby said lever is rocked in moving from the "off" position and is not rocked in moving toward the "off" position.

6. In a controller regulator, a stationary member, a revoluble member, stops and cams carried by one of said members, and a lever and means for positively engaging said stops carried by the other of said members, said lever comprising a dog engaged by said cams whereby said lever is rocked in moving from the "off" position and is not rocked in moving toward the "off" position.

7. In a controller regulator, a base, a plunger adapted to reciprocate in said base, a lever for moving said plunger, a device movable relatively to said lever, and a hood having stops and cams thereon, said cams engaging said device to rock said lever and move said plunger into position for engaging said stops in moving from the "off" position.

8. In a controller regulator, a base, a lever and a plunger carried by said base, said lever having means at one end thereof for engaging said plunger and a movable device at the other end thereof, in combination with a hood having thereon stops adapted for engaging said plunger and cams adapted for engaging said device, said cams acting upon said device to rock said lever in moving from the "off" position and said device moving from said cams relatively to said lever in reversing.

9. In a controller regulator, a stationary member, a revoluble member, cams and stops carried by one of said members, and means comprising a lever having a dog pivoted thereto carried by the other of said members, said cams engaging said dog to rock said lever.

10. In a controller regulator, a stationary member, a movable member, cams and stops fixed relatively to one of said members, a plunger carried by the other of said members and adapted to reciprocate into and out of engagement with said stops, and means whereby said cams move said plunger longitudinally of the shaft of the controller into engagement with said stops.

In witness whereof I have hereunto set my name this 16 day of December, 1911, in the presence of the subscribing witnesses.

CYRUS P. EBERSOLE.

Witnesses:
G. W. Cox,
E. F. Cox.

---

Copies of this patent may be obtained for five cents each, by addressing the "Commissioner of Patents, Washington, D. C."